United States Patent [19]
Yielding

[11] Patent Number: 6,095,365
[45] Date of Patent: Aug. 1, 2000

[54] PIVOTING HATCH COVER ASSEMBLY

[75] Inventor: Bryan A. Yielding, Riceville, Tenn.

[73] Assignee: The Heil Company, Chattanooga, Tenn.

[21] Appl. No.: 09/138,933

[22] Filed: Aug. 24, 1998

[51] Int. Cl.$^7$ ................................................ B65D 90/10
[52] U.S. Cl. .................... 220/264; 220/324; 220/823; 292/256.5; 105/377.07; 105/377.11
[58] Field of Search ................................ 220/263, 264, 220/291, 813, 820, 823, 824, 830, 314, 315, 324, 325, 326, 327, 328; 292/256.5, 256.75, 256.71; 105/377.05, 377.06, 377.07, 377.08, 377.09, 377.11

[56] References Cited

U.S. PATENT DOCUMENTS

| | | | |
|---|---|---|---|
| 1,234,133 | 7/1917 | Cole | 220/325 |
| 1,494,745 | 5/1924 | Griffin et al. | 220/823 X |
| 1,669,022 | 5/1928 | Root . | |
| 1,683,823 | 9/1928 | Heil . | |
| 1,685,132 | 9/1928 | Joy . | |
| 1,870,973 | 8/1932 | Thwaits . | |
| 1,883,880 | 10/1932 | Cole . | |
| 1,896,330 | 2/1933 | Ruppel | 220/823 |
| 1,929,761 | 10/1933 | Thwaits . | |
| 2,120,961 | 6/1938 | Beede | 220/823 |
| 2,420,411 | 5/1947 | Blount, Sr. | 220/324 |
| 3,151,903 | 10/1964 | Effner | 220/324 |
| 3,262,227 | 7/1966 | Pentecost | 220/823 |
| 3,360,155 | 12/1967 | Colonna | 220/325 |
| 3,666,135 | 5/1972 | Kindle | 220/263 X |
| 3,860,142 | 1/1975 | Jurges . | |
| 4,044,918 | 8/1977 | Alton | 220/325 X |
| 4,441,431 | 4/1984 | Carney, Jr. et al. | 220/314 |
| 4,461,597 | 7/1984 | Laurin . | |
| 5,105,966 | 4/1992 | Fort et al. . | |
| 5,366,317 | 11/1994 | Solimar . | |
| 5,657,892 | 8/1997 | Bolli et al. | 220/325 |
| 5,918,756 | 7/1999 | Morgan | 220/263 |

FOREIGN PATENT DOCUMENTS

| | | | |
|---|---|---|---|
| 2252861 | 5/1973 | Germany | 220/325 |
| 660242 | 2/1964 | Italy | 220/263 |
| 94/04443 | 3/1994 | WIPO | 220/325 |

*Primary Examiner*—Nathan J. Newhouse
*Attorney, Agent, or Firm*—Chambliss, Bahner & Stophel, P.C.

[57] ABSTRACT

A hatch cover assembly for an access port includes a hatch which is adapted to cover the access port and a mechanism for applying a generally vertically-directed force to the hatch to raise it upwardly off the port, while maintaining the hatch in a generally-horizontal attitude. The assembly also includes a mechanism for mounting the hatch on the access port so that the hatch may be rotated about a generally vertical shaft from a closed position which covers the port to an open position which exposes the port, while avoiding any non-pivotal horizontal movement of the hatch with respect to the access port.

17 Claims, 7 Drawing Sheets

PIVOTING HATCH COVER ASSEMBLY

FIELD OF THE INVENTION

This invention relates generally to coverings for manholes or access ports, especially those permitting access into pressurized vessels. In a preferred embodiment, the invention provides a hatch cover for the pressurized tank of a pneumatic tank trailer that is adapted for transporting various products in bulk.

BACKGROUND AND DESCRIPTION OF THE PRIOR ART

Many granular or fluent particulate materials are conveniently transported by truck, although they may also be transported by railcar, barge or by other means. Trucks that are used to transport such materials may include a tractor and an attached trailer having a tank or other container mounted thereon. Frequently, these trailers are referred to as pneumatic tank trailers because of the pneumatic method, involving gas- or air-entrainment, by which they may be loaded and unloaded. Materials that are generally transported in pneumatic tank trailers include agricultural products such as grain, corn kernels, beans, flour, sugar, peanuts and the like, and intermediate products for various industrial uses such as plastic pellets, coke, lime, silica gel, powdered acid resins, rare earth powders and powdered alumina, and many others.

Pneumatic tank trailers may have one or more product tanks or compartments, each of which is generally provided with an opening or access port. These access ports are provided for loading of the compartment with product and are usually located at the top of the compartment. Access ports are also usually large enough to allow a person to enter the compartment for inspection or cleaning. Access ports are usually circular and may have a diameter of about 20 inches. In addition, conventional access ports are frequently provided with a raised lip or collar around the periphery of the port. Each access port is also provided with a hatch cover assembly that permits the port to be closed or sealed. Because most of these pneumatic trailers are unloaded by a method which involves pressurizing the tank or product compartment, the hatch cover assembly is usually capable of maintaining a sufficient seal of the access port to maintain the pressure within the tank. Therefore, they are usually of relatively massive and heavy construction. Conventional hatch cover assemblies include a hatch cover that is hinged at one side so as to pivot about a horizontal axis, so that when the hatch cover is open, it extends vertically upwardly from the surface of the compartment. One such hatch cover assembly is described in U.S. Pat. No. 3,860,142 of Jurges.

Because of the method by which they operate, conventional hatch cover assemblies may not permit loading of the product into the trailer in a garage or other structure, because there may be insufficient clearance to permit the cover to be opened. In addition, conventional hatch covers may be difficult for some persons to operate, because most of the weight of the cover must be manually lifted upwardly in order to open it. It would be desirable, therefore, if a hatch cover assembly could be provided that could be opened in a garage or other structure having low clearance. It would also be desirable if such an assembly could be provided that would be easier than conventional assemblies for a person to operate.

OBJECTS AND ADVANTAGES OF THE INVENTION

Accordingly, it is an object of the invention claimed herein to provide a hatch cover assembly that may be opened in a garage or other structure having low clearance. It is another object of the invention to provide such an assembly that may be opened without requiring manual lifting of most of the weight of the cover. Another object of the invention is to provide a hatch cover assembly that uncovers the access port with which it is associated by raising the hatch upwardly off the access port, while maintaining the hatch in a generally-horizontal attitude. Yet another object of the invention is to provide a hatch cover assembly that is of relatively simple construction. Additional objects and advantages of this invention will become apparent from an examination of the drawings and the ensuing description.

EXPLANATION OF TECHNICAL TERM

As used herein, an access port is an opening provided in a top wall of a product container, which container may be mounted on a pneumatic tank trailer or other over-the-road trailer, a railcar, a barge or other means of conveyance, or it may be mounted in a fixed facility. The access port may be provided with a raised lip or collar around its periphery, and it may be of any convenient size and shape.

SUMMARY OF THE INVENTION

The invention comprises a hatch cover assembly for an access port. This assembly includes a hatch which is adapted to cover the access port, and means for applying a generally vertically-directed force to the hatch to raise it upwardly off the port, while maintaining the hatch in a generally-horizontal attitude. The assembly also includes means for mounting the hatch on the access port so that the hatch may be rotated about a generally vertical axis from a closed position which covers the port to an open position which exposes the port, while avoiding any non-pivotal horizontal movement of the hatch with respect to the access port.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
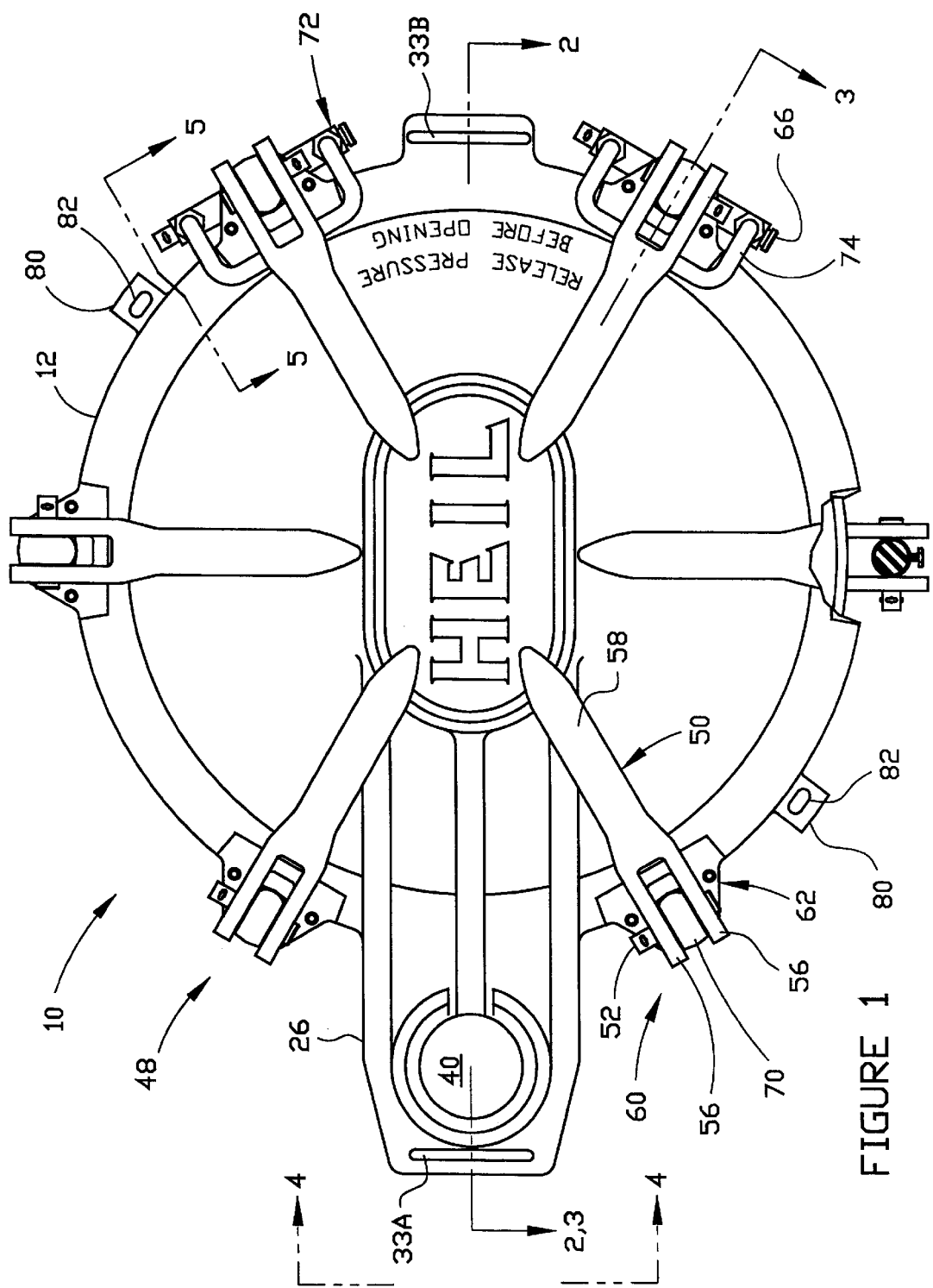
FIG. 1 is a top view of a preferred embodiment of the invention, showing the hatch cover assembly in a closed position covering an access port.
Figure 2:
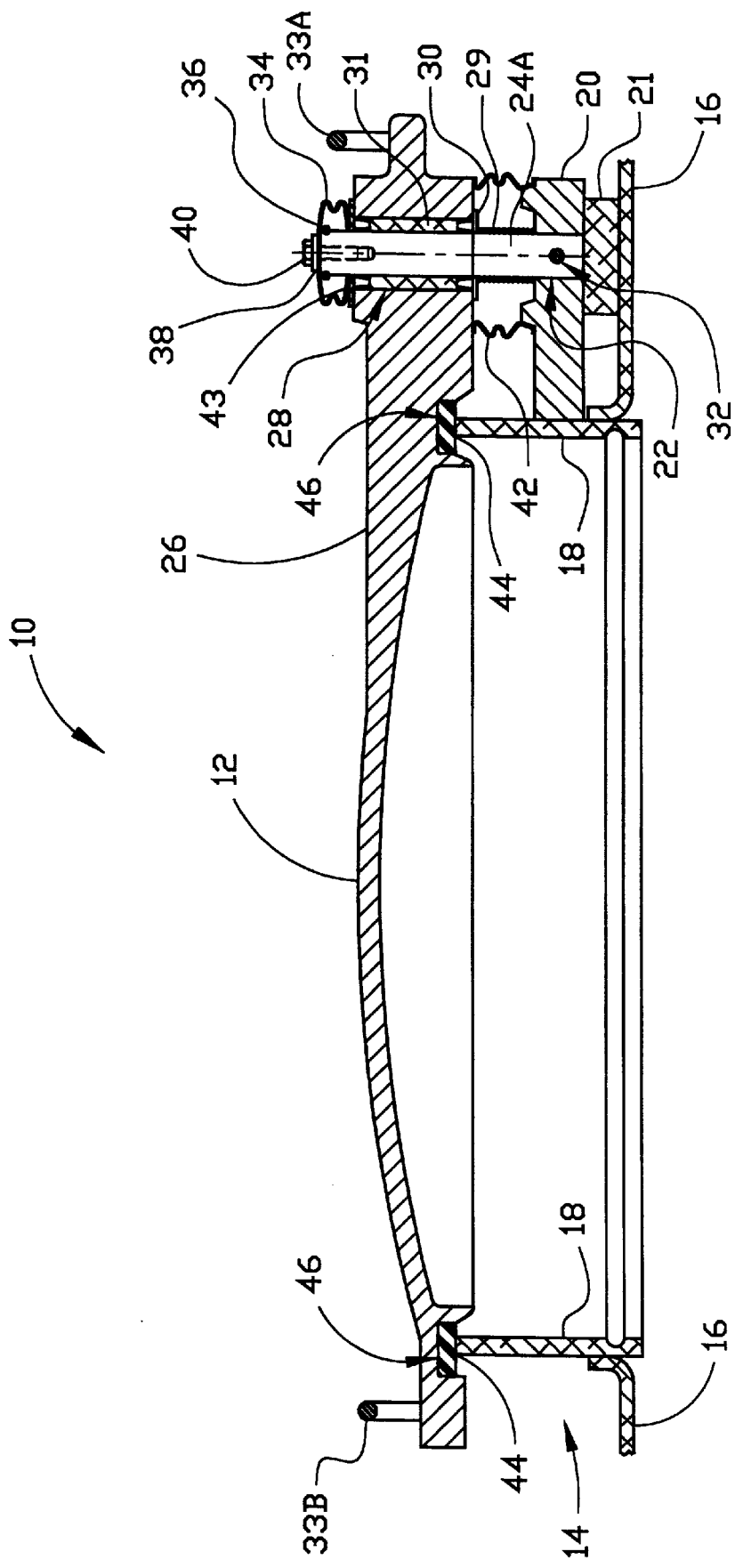
FIG. 2 is a sectional view of the hatch cover assembly of FIG. 1, taken along the line 2—2 of FIG. 1, which illustrates a first embodiment of the mounting means of the invention.
Figure 3:
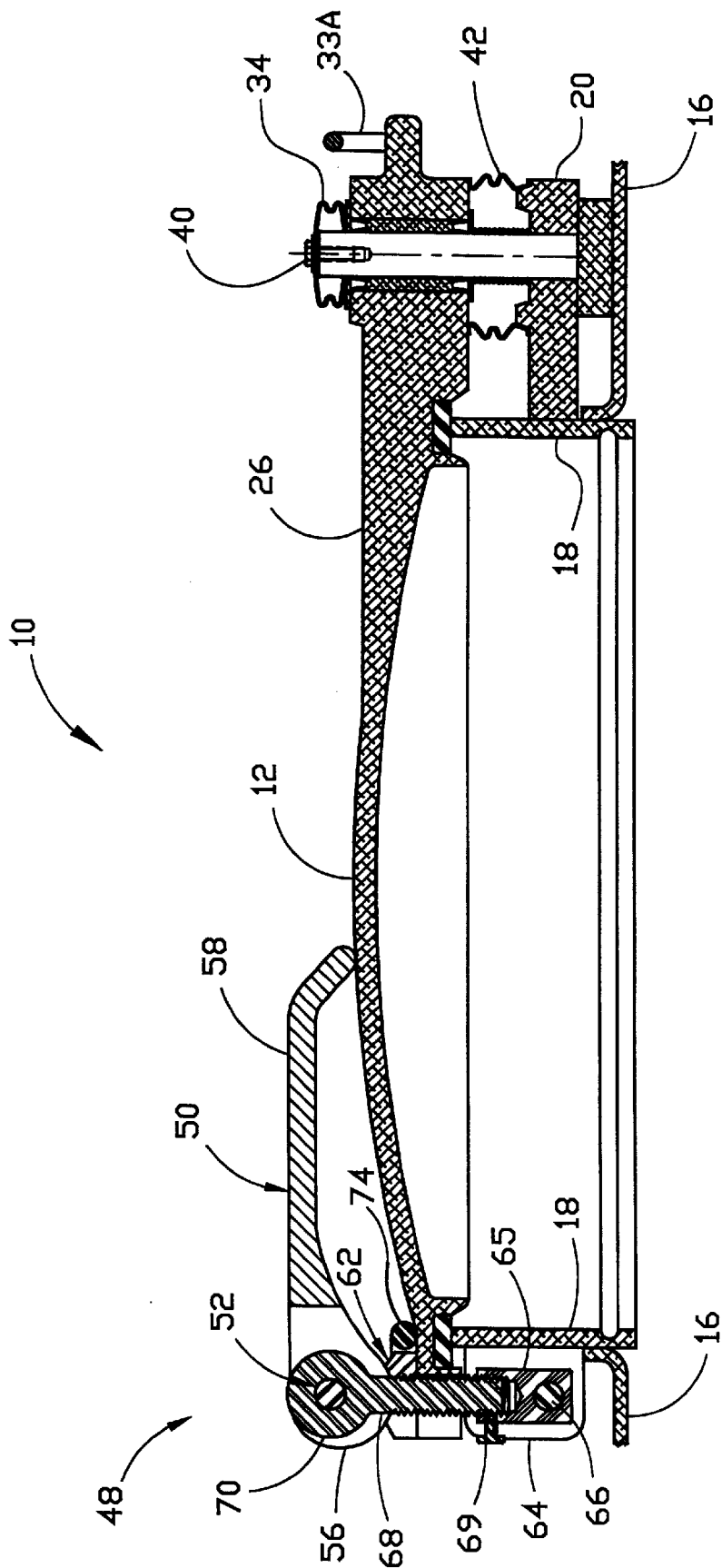
FIG. 3 is a is a sectional view of the hatch cover assembly of FIG. 1, taken along the line 3—3 of FIG. 1, which further illustrates the mounting means of FIG. 2, as well as the preferred lock of the embodiment of FIG. 1.
Figure 4:
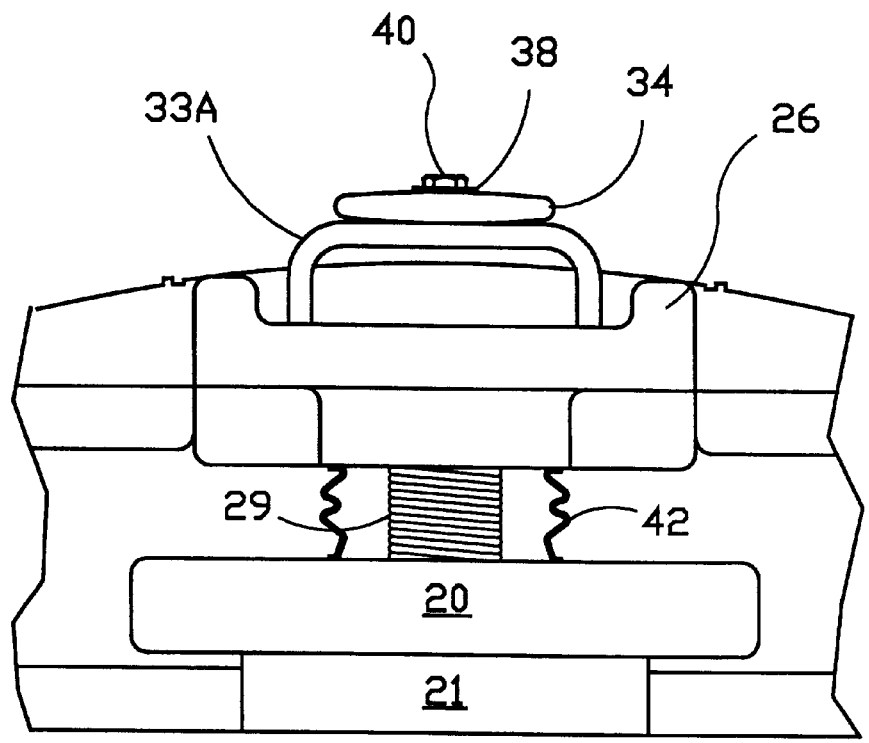
FIG. 4 is a partial side view of the hatch cover assembly of FIG. 1, taken along the line 4—4 of FIG. 1.
Figure 5:
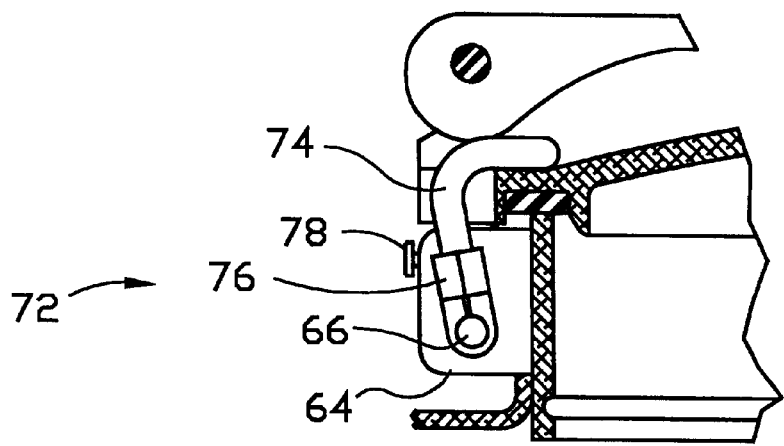
FIG. 5 is a partial sectional view of the hatch cover assembly of FIG. 1, taken along the line 5—5 of FIG. 1, which illustrates a portion of the lock of the preferred embodiment of the invention.
Figure 6:
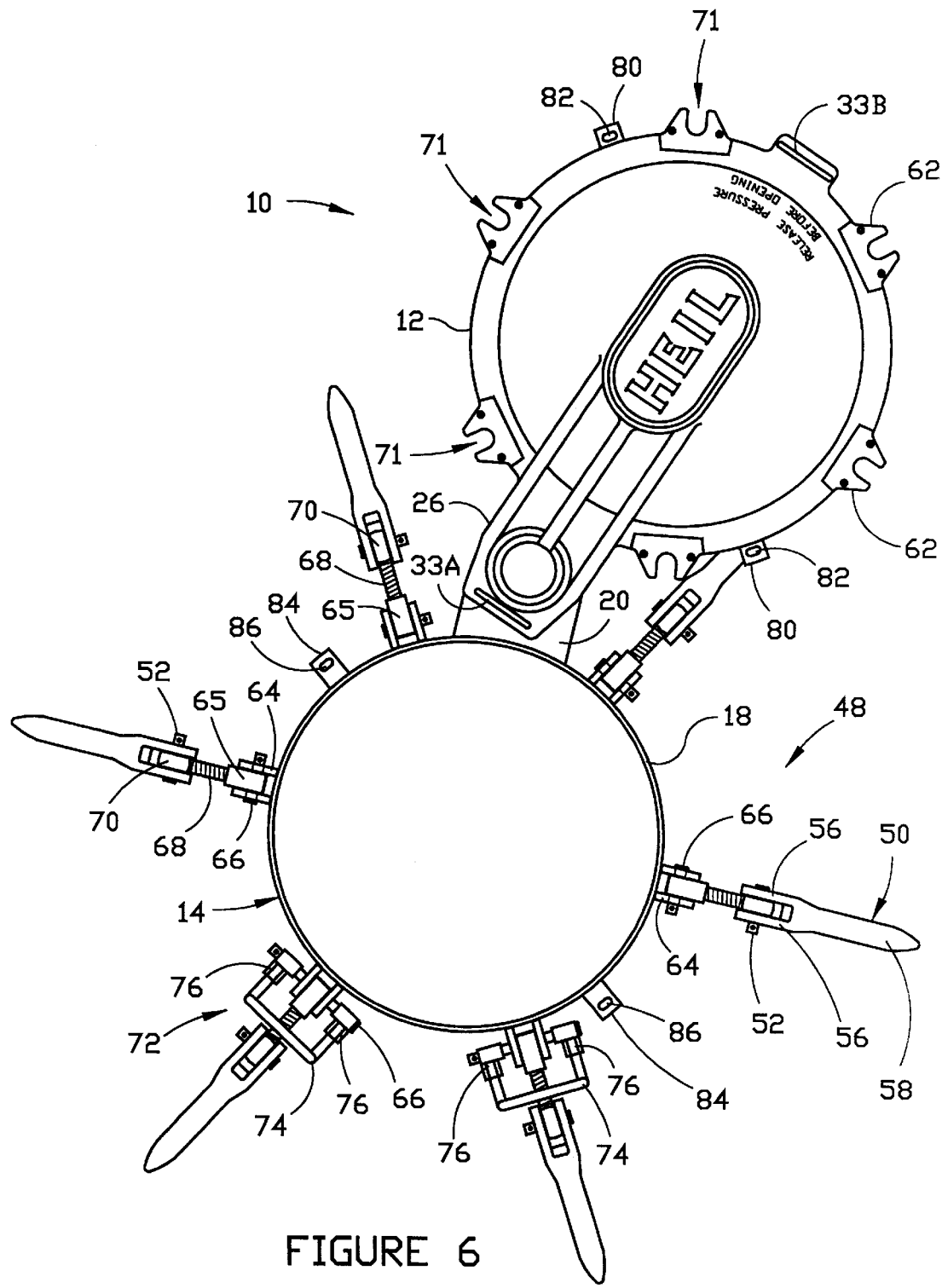
FIG. 6 is a top view of the embodiment of FIG. 1, illustrating the hatch cover removed from the access port.
Figure 8:
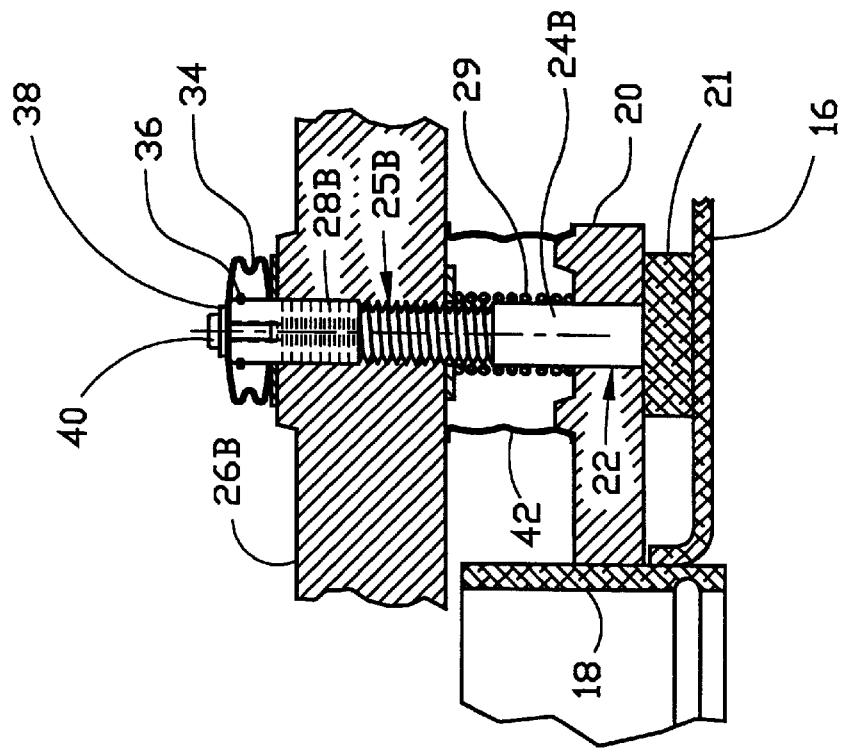
FIG. 8 is a partial sectional view of the embodiment of FIG. 7, showing the hatch in an open position.
Figure 7:
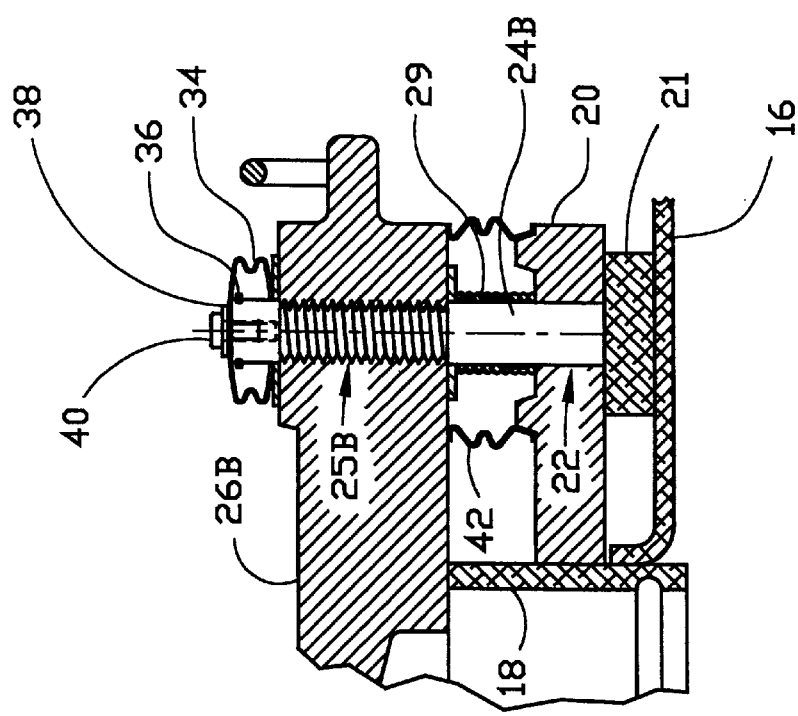
FIG. 7 is a partial sectional view of a second embodiment of the mounting means of the invention, showing the hatch in a closed position.
Figure 9:
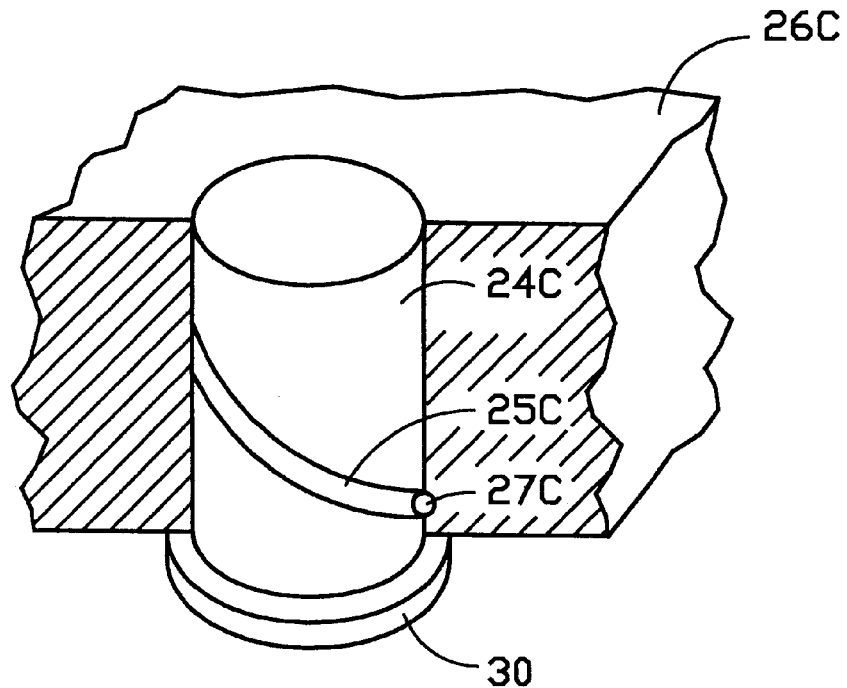
FIG. 9 is a perspective view of a shaft and follower of a third embodiment of the mounting means of the invention, showing the cooperation of such components.
Figure 10:
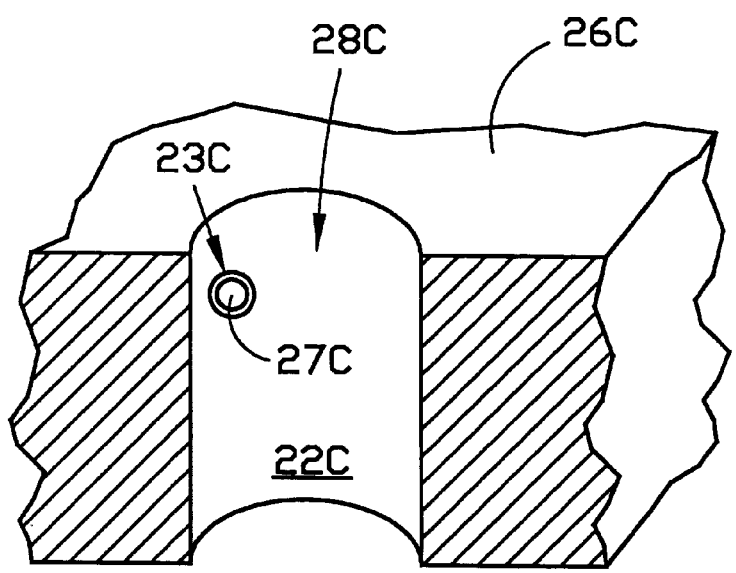
FIG. 10 is a partial sectional view of a portion of the hole in the shaft seat of the embodiment of the invention illustrated in FIG. 9, showing the follower of FIG. 9 mounted therein.

FIGS. 1 and 4 through 6 of the drawings illustrate a preferred embodiment of the invention that is particularly suited for use in connection with pneumatic tank trailers, although it may also be used in connection with other access ports for product containers. Referring now to FIGS. 1 and 6, hatch cover assembly 10 includes hatch cover or hatch 12 which is adapted to cover access port 14 (best shown in FIG. 6) in the upper wall 16 of a product compartment (not shown) of a pneumatic tank trailer. Access port 14 is provided with raised lip or collar 18 around its periphery. The hatch cover must have a shape and size that is sufficient to cover the access port with which it is associated. As shown in FIGS. 1 and 6, preferred hatch cover 12 is generally circular in shape, although a hatch cover of the invention may alternatively be octagonal or of other convenient shape. Preferably, hatch cover 12 is formed with a domed configuration as illustrated in FIGS. 2 and 3, in order to provide strength for maintaining the pressure within the tank. FIGS. 2 and 3 also illustrate a first embodiment of the mounting means of the invention, by which hatch 12 is mounted on the access port. FIGS. 7 and 8 illustrate a second embodiment of the mounting means of the invention, and FIGS. 9 and 10 illustrate a third.

Hatch cover assembly 10 also includes means for mounting the hatch cover on the access port. As shown in FIGS. 2, 3, 7 and 8, such mounting means includes shaft seat 20 that is located adjacent to the access port, and is preferably welded into place on support 21 and against collar 18. Shaft seat 20 is provided with a hole 22 that is adapted to support a shaft which is seated in the hole and disposed in a generally vertical direction. The shaft may be provided in the form of a hollow rod such as shaft 24A, the embodiment of FIGS. 2 and 3, or a solid rod such as shaft 24B, the embodiment of FIGS. 7 and 8, or shaft 24C, the embodiment of FIG. 9.

Hatch cover assembly 10 also includes elongate hinge portion 26 that is attached to the hatch cover 12 so as to extend beyond port 14, and which is also provided with a hole 28 that is adapted to mate with the shaft. In addition, a biasing mechanism is mounted between the seat and the hinge portion and is adapted to apply a generally vertically-directed force between the seat and the hinge portion so as to raise the hatch cover upwardly off the port, while maintaining it in a generally-horizontal attitude.

As shown in FIG. 2 with respect to the embodiment of the invention employing a hollow shaft, the biasing mechanism may preferably comprise compression spring 29, which is located between hinge portion 26 and seat 20 (or preferably between washer 30, which is attached to the bottom of hinge portion 26, and seat 20) and around shaft 24A. In the alternative, a hydraulic cylinder (not shown) may be located within hollow shaft 24A between support 21 and a top bearing support (not shown). Other biasing means which are known or which may be subsequently developed may also be employed. Spring 29 or other biasing means will act to apply a generally vertically-directed force between the seat and the hinge portion so as to raise the hatch cover upwardly off the port, while maintaining the hatch in a generally-horizontal attitude. The vertically-directed force can be overcome by manually pushing downwardly on hatch cover 12 and securing one or more of the locking mechanisms (the operation of which shall be explained in more detail subsequently).

It is preferred that when the mounting means is designed to raise the hatch without also rotating it about the shaft, as in the embodiment of FIGS. 2 and 3, the hole in the hinge portion be larger in diameter than that in the shaft seat so that bearing 31 may be placed in the hole. This bearing will provide additional support for shaft 24A and will facilitate rotation of the hinge portion thereon. Good results have been obtained, when the invention is designed to cover an access port having an outside diameter of 20 inches, by providing shaft 24A in the form of a stainless steel hollow rod having an outside diameter of about 0.825 inches, which is supported in hole 28 by a bronze bearing. The cooperation of hinge portion 26, shaft seat 20 and shaft 24A permit the hatch to be mounted on the access port in such fashion that the hatch may be rotated (when the lock is disengaged so that the biasing mechanism will raise the hatch) about a generally vertical axis defined by the shaft from a closed position which covers the port to an open position which exposes the port, while avoiding any non-pivotal horizontal movement of the hatch with respect to the access port. The avoidance of non-pivotal horizontal movement provides for a more simplified construction of the assembly.

Preferably, shaft 24A will fit tightly in hole 22 in seat 20 so as to be restrained from turning as the hatch is rotated about this axis of rotation. If desired, shaft 24A may be further restrained from turning by retaining pin 32 which extends all the way through the shaft and is retained in a recess (not shown) in seat 20. The open top of shaft 24 is covered by boot 34 (see FIGS. 2 through 4), which is preferably made from rubber or other flexible material. The boot is retained on the shaft between retaining ring 36 and washer 38 which is secured with pin 40. A similar boot 42, which is compressible, protects spring 29 from dust and dirt. Boot 42 (illustrated as being cut away in FIG. 4) is of sufficient dimension and flexibility to protect the spring both when it is compressed (as shown in FIGS. 2 and 3) and when it has raised the hatch off of the access port.

As the hatch is raised off the access port, its vertical rise will be stopped by contact between washer 43, which is mounted atop hinge portion 26, and retaining ring 36. This restriction permits hatch 12 to be raised upwardly only as much as is necessary to clear collar 18 of port 14, whereupon it may be rotated about the axis defined by shaft 24A to completely clear the access port (see FIG. 6). Handles 33a and 33b are provided for use in controlling the vertical rise of the hatch and in rotating the hatch between its open and closed positions.

Assembly 10 also includes sealing gasket 44 that is adapted to seal the hatch cover over the raised lip or collar 18 around the periphery of port 14. As shown in FIGS. 2 and 3, gasket 44 is preferably provided in channel 46 that is disposed around the periphery of the inside surface of hatch cover 12.

Two types of conventional locking mechanisms for fastening the hatch cover down on the port are preferably provided in assembly 10. Primary lock assembly 48 (six of which are shown in FIGS. 1 and 6, although any convenient number may be employed) includes camming member 50 which rotates about a generally horizontal axis defined by camshaft 52. Camming member 50 (see FIG. 3) includes a cam portion, which is provided in assembly 10 in the form of a pair of leg portions 56 (see FIG. 6), and elongate arm 58, which is attached to the cam portion. Cam mount 60 is located adjacent to the port, and cam bearing plate 62 is mounted on hatch cover 12 (see FIG. 6). Cam mount 60 preferably includes cam support brackets 64 and cam adjusting nut 65, which is mounted by means of pin 66 to the support brackets. In addition, cam mount 60 includes cam adjusting bolt 68 that may be adjustably received in nut 65 and retained by stop screw 69. By adjusting the depth of bolt 68 in nut 65, the amount of camming force applied by primary locking assembly 48 may be adjusted. Preferably, an antiseizing compound is applied to the adjusting threads of bolt 68 during assembly of the cam support mechanism.

Camshaft 52 is disposed in a generally horizontal direction and is mounted through the cam leg portions 56 and through the head 70 of bolt 68 in the cam mount. Cam bearing plate 62 is provided with a slot 71 that is adapted to receive bolt 68. In operation, the cam adjusting nut is rotated about pin 66 to raise nut 65 and bolt 68 to a generally vertical position, with bolt 68 disposed in slot 71 of a bearing plate. Camming member 50 may then be rotated about camshaft 52 while leg portions 56 bear against bearing plate 62, from an unlocked position in which arm 58 does not contact the hatch to a locked position in which the arm contacts and bears against the hatch.

Secondary lock assembly 72 is also preferably included in assembly 10. Two such secondary assemblies are illustrated in FIGS. 1 and 6, and additional details of assembly 72 are shown in FIGS. 3 and 5. Assembly 72 includes pivoting arm 74 that is mounted in base portions 76 and secured therein by screw 78 (see FIG. 5). The pivoting arm and attached base portions are adapted to be rotated about an elongated shaft 66 that is generally horizontally-disposed and mounted for rotation in brackets 64 adjacent to the port, from an unlocked position in which the arm does not contact the hatch to a locked position in which the arm contacts and bears against the hatch. Shaft 66 also permits both the primary lock assemblies 48 and the secondary lock assemblies 72 to be rotated completely out of contact with the hatch cover so that the hatch may be opened, as shown in FIG. 6. As shown in FIGS. 3 and 5, secondary lock 72 is mounted on two of the primary lock assemblies so as to work in cooperation therewith. Preferably, the secondary lock assemblies are placed opposite hinge portion 26, although they may also be employed in connection with any convenient number (including all) of the primary locks. Secondary lock 72 must be engaged before the primary lock with which it is associated can be secured.

Of course, other types of locking mechanisms than the preferred primary and secondary locking mechanisms of assembly 10 may also be employed. A series of tabs 80 having slots 82 may be provided, for example in hatch cover 12 (see FIG. 6), which tabs may be aligned with corresponding tabs 84 having slots 86 that are attached to collar 18 of the access port. A bolt or padlock may then be placed through the corresponding slots of tabs 80 and 84 and secured to hold hatch cover 12 in a closed position on collar 18.

A comparison of FIGS. 1 and 6 will illustrate the operation of preferred hatch cover assembly 10. In order to provide access to the product compartment, camming members 50 of primary lock assemblies 48 must be rotated upwardly and back to clear hatch cover 12. Then, the pivoting arms 74 and attached base portions 76 of secondary lock assemblies 72 must also be rotated out of contact with hatch cover 12. Handles 33a and 33b may then be grasped, if necessary, to assist in controlling the vertical rise of the hatch off collar 18 under the influence of the biasing means, and to assist in rotating the hatch about the axis defined by shaft 24 to its open position (see FIG. 6). When it is desired to close and secure the hatch, the handles may be grasped to assist in rotating the hatch cover about shaft 24 to cover the access port. Then the vertically-directed force imposed by the biasing means can be overcome by manually pushing downwardly on hatch cover 12 to seat annular gasket 44 atop collar 18, and pivoting arms 74 and attached base portions 76 of secondary lock assemblies 72 may be rotated about pin 66 to contact the hatch cover, and thereby secure the hatch. Cam adjusting nuts 65 may then be rotated about pins 66 to raise nuts 65 and associated bolts 68 to a generally vertical position, with bolts 68 disposed in slots 71 of bearing plates 62. Camming members 50 may then be rotated upwardly and towards the center of hatch cover 12 about camshafts 52 while leg portions 56 bear against bearing plate 62, until arms 58 of the camming members contact said hatch cover to further secure the cover on the access port.

FIGS. 7 and 8 illustrate a second embodiment of the mounting means of the invention, which provides for automatic rotation of the hatch about the shaft as the hatch is raised under the influence of the biasing mechanism. As shown in FIGS. 7 and 8, such mounting means includes shaft seat 20 that is located adjacent to the access port, and is preferably welded into place on support 21 and against collar 18. Shaft seat 20 is provided with a hole 22 that is adapted to support solid shaft 24B, which is seated in hole 22 and disposed in a generally vertical direction. Shaft 24B is threaded at upper portion 25B thereof, and is adapted to fit tightly in hole 22 so as to be restrained from turning therein. The hatch cover assembly of FIGS. 7 and 8 also includes elongate hinge portion 26B that is attached to the hatch cover (not shown), and which is also provided with threaded hole 28B (see FIG. 8) that is adapted to mate with threaded portion 25B of the shaft.

In addition, a biasing mechanism, such as compression spring 29, is mounted between the seat and the hinge portion and is adapted to apply a generally vertically-directed force between the seat and the hinge portion so as to raise the hatch cover upwardly off the port, while maintaining it in a generally-horizontal attitude. Preferably, spring 29 is located between washer 30, which is attached to the bottom of hinge portion 26B, and seat 20 and around shaft 24B. Spring 29 or other biasing means will act to apply a generally vertically-directed force between the seat and the hinge portion so as to raise the hatch cover upwardly off the port, while maintaining the hatch in a generally-horizontal attitude. However, because of the cooperation between the threads on shaft 24B and the threads in hole 28B, the hinge portion, and therefore the hatch, will rotate from a position which covers the port (FIG. 7) to a position which exposes the port (FIG. 8) as the biasing mechanism applies the generally vertically-directed force. Thus, the hatch may be rotated (when the lock is disengaged so that the biasing mechanism will raise the hatch) about a generally vertical axis defined by the shaft from a closed position which covers the port to an open position which exposes the port, while avoiding any non-pivotal horizontal movement of the hatch with respect to the access port.

As shown in FIG. 7, the hatch cover of this embodiment of the invention does not include a channel such as channel 46 in hatch cover 12 (see FIG. 2), because the presence of such channel would inhibit initial rotation of the hatch cover off collar 18 of the access port. A flat gasket (not shown) may be provided in this embodiment of the invention (instead of a gasket such as gasket 44 that is adapted to fit within channel 46 of hatch cover 12) to further seal the hatch atop collar 18 over the access port, provided that such gasket does not inhibit initial rotation of the hatch cover.

The open top of shaft 24B is covered by boot 34, and a similar boot 42, which is compressible, protects spring 29 from dust and dirt. Boot 42 (illustrated as being cut away in FIGS. 7 and 8) is of sufficient dimension and flexibility to protect the spring both when it is compressed (as shown in FIG. 7) and when it has raised the hatch off of the access port (as shown in FIG. 8).

The vertically-directed force exerted by spring 29 can be overcome by manually pushing downwardly on the hatch cover, and/or by turning it in the closing direction, which will cause threaded hinge portion 28B to rotate about threaded portion 25B of shaft 24B, from the open position to the closed position, while still avoiding any non-pivotal horizontal movement of the hatch with respect to the access port. When the hatch is seated on collar 18, one or more of the locking mechanisms may be secured.

FIGS. 9 and 10 illustrate a third embodiment of the mounting means of the invention that operates in a fashion similar to that of the embodiment of FIGS. 7 and 8. However, this embodiment of the invention may be employed with a hatch cover that includes a channel such as channel 46 in hatch cover 12 (see FIG. 2).

Shaft 24C is adapted to be seated tightly in hole 22 in shaft seat 20 (not shown) so as to be restrained from turning therein. The upper portion of shaft 24C (see FIG. 9) is provided with groove 25C, which includes a vertical rise (not shown) to permit the hatch cover to be raised so that channel 46 will clear collar 18 on the access port prior to rotation of the hatch cover and a helical portion which extends around the periphery of the shaft. Hinge portion 26C is provided with hole 28C (see FIG. 10) having an inner surface 22C that is provided with a follower that is adapted to mate with the groove. Preferably, the follower is a ball such as ball bearing 27C that is mounted within recess 23C in the inner surface 22C of the hole in the hinge portion. Although the recess is shown as being generally hemispherical, it may be of any convenient shape. In the alternative, the follower may be formed in the inner surface of the hole, or if provided in the form of a ball, it may be simply pressed into the hole surface. Alternatively (although not illustrated in the drawings), the inner surface in the hole in the hinge portion may be provided with a groove having a vertical rise and a helical portion around the periphery thereof and the shaft may be provided with a follower that is adapted to mate with the groove. In such embodiment, the follower may be a ball similar to follower 27C that is mounted within a recess in the shaft.

Regardless, however, of whether the groove is provided in the shaft or in the inner surface of the hole, the groove and follower are arranged so that as the biasing mechanism applies a generally vertically-directed force between the seat and the hinge portion to raise the hatch upwardly off the port, the follower will travel within the groove as the hinge portion rotates about shaft 24C so that the hatch will rotate from a position which covers the port to a position which exposes the port. Such relative locations of the groove and follower are illustrated in FIGS. 9 and 10. Preferably, the groove and follower are arranged so that the hatch rotates through an arc of at least 90° as the biasing mechanism applies the force between the seat and the hinge portion to raise the hatch upwardly off the port.

The vertically-directed force exerted by the biasing mechanism can be overcome by manually pushing downwardly on the hatch cover, which will cause the follower to follow the groove and thereby rotate the hinge portion of the hatch about the axis of shaft 24C, from the open position (FIGS. 9 and 10) to the closed position (not shown), while still avoiding any non-pivotal horizontal movement of the hatch with respect to the access port. When the hatch is seated on collar 18, one or more of the locking mechanisms may be secured.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. A hatch cover assembly for an access port which comprises:

(a) a hatch which is adapted to cover the access port;

(b) a shaft seat that is located adjacent to the access port, said shaft seat being provided with a hole that is adapted to support a generally vertically-disposed shaft;

(c) a shaft that is adapted to be seated in the hole in the shaft seat and disposed in a generally vertical direction;

(d) an elongate hinge portion that is attached to the hatch so as to extend beyond the port, said hinge portion being provided with a hole that is adapted to mate with the shaft, so that said hatch may be rotated about the shaft from a closed position which covers the port to an open position which exposes the port, while avoiding any non-pivotal horizontal movement of the hatch with respect to the access port;

(e) a biasing mechanism which is mounted between the seat and the hinge portion and which is adapted to apply a generally vertically-directed force between the seat and the hinge portion so as to raise the hatch upwardly off the port;

(f) a mechanism which provides automatic rotation of the hatch from the closed position which covers the port to the open position which exposes the port as the biasing mechanism applies the generally vertically-directed force between the seat and the hinge portion to raise the hatch upwardly off the port.

2. The hatch cover assembly of claim 1 wherein the biasing mechanism comprises a compression spring.

3. The hatch cover assembly of claim 1 which includes a stop that restricts the upward motion of the hatch off the port.

4. The hatch cover assembly of claim 1 wherein the mechanism for automatic rotation of the hatch is the shaft having threads, and the hole in the hinge portion is provided with threads that are adapted to mate therewith so that as the biasing mechanism applies the generally vertically-directed force between the seat and the hinge portion to raise the hatch upwardly off the port, the hatch will rotate from the closed position which covers the port to the open position which exposes the port by virtue of cooperation between the threaded shaft and the mating threads in the hinge portion.

5. The hatch cover assembly of claim 1 wherein the mechanism for automatic rotation of the hatch is the shaft provided with a groove having a helical portion around the periphery thereof, and wherein the hole in the hinge portion has an inner surface that is provided with a follower that is adapted to mate with the groove, said groove and follower being arranged so that as the biasing mechanism applies the generally vertically-directed force between the seat and the hinge portion to raise the hatch upwardly off the port, the follower will travel within the groove and the hatch will rotate from the closed position which covers the port to the open position which exposes the port.

6. The hatch cover assembly of claim 5 wherein the helical groove and follower are arranged so that the hatch rotates through an arc of at least 90° as the biasing mechanism applies a generally vertically-directed force between the seat and the hinge portion to raise the hatch upwardly off the port.

7. The hatch cover assembly of claim 5 wherein the follower is a ball that is mounted within a recess in the inner surface of the hole in the hinge portion.

8. The hatch cover assembly of claim 1 wherein the mechanism for automatic rotation of the hatch is the hole in the hinge portion having an inner surface that is provided with a groove having a helical portion around the periphery thereof, and wherein the shaft is provided with a follower that is adapted to mate with the groove, said groove and follower being arranged so that as the biasing mechanism applies the generally vertically-directed force between the seat and the hinge portion to raise the hatch upwardly off the port, the follower will travel within the groove and the hatch will rotate from the closed position which covers the port to the open position which exposes the port.

9. The hatch cover assembly of claim 8 wherein the groove and follower are arranged so that the hatch rotates through an arc of at least 90° as the biasing mechanism applies a generally vertically-directed force between the seat and the hinge portion to raise the hatch upwardly off the port.

10. The hatch cover assembly of claim 8 wherein the follower is a ball that is mounted within a recess in the shaft.

11. The hatch cover assembly of claim 1 which includes a lock for fastening the hatch down on the port.

12. The hatch cover assembly of claim 11 wherein the lock is comprised of a camming member which includes:

(a) a cam portion having an elongate arm attached thereto;

(b) a cam mount which is located adjacent to the port;

(c) a cam bearing plate which is mounted on the hatch;

(d) a generally horizontally-disposed camshaft that is disposed through the cam portion and mounted in the cam mount, so that the camming member may be rotated about the camshaft while the cam portion bears against the cam bearing plate, from an unlocked position in which the arm does not contact the hatch to a locked position in which the arm contacts and bears against the hatch.

13. The hatch cover assembly of claim 12 which includes a secondary lock comprised of a pivoting arm that is adapted to be rotated about a generally horizontally-disposed shaft which is mounted adjacent to the port, from an unlocked position in which the arm does not contact the hatch to a locked position in which the arm contacts and bears against the hatch.

14. A hatch cover assembly for an access port in a tank which is adapted for pressurized containment, said access port having a raised lip around the periphery thereof, said hatch cover assembly comprising:

(a) a hatch cover which is adapted to cover the access port;

(b) a shaft seat that is located adjacent to the access port, said shaft seat being provided with a hole that is adapted to support a generally vertically-disposed shaft;

(c) a shaft that is adapted to be seated in the hole in the shaft seat and disposed in a generally vertical direction;

(d) an elongate hinge portion that is attached to the hatch cover so as to extend beyond the port, said hinge portion being provided with a hole that is adapted to mate with the shaft, so that said hatch cover may be rotated about the shaft from a closed position which covers the port to an open position which exposes the port;

(e) a biasing mechanism which is mounted between the seat and the hinge portion and which is adapted to apply a generally vertically-directed force between the seat and the hinge portion so as to raise the hatch cover upwardly off the port;

(f) a mechanism which provides automatic rotation of the hatch from the closed position which covers the port to the open position which exposes the port as the biasing mechanism applies the generally vertically-directed force between the seat and the hinge portion to raise the hatch upwardly off the port;

(g) a sealing gasket that is adapted to seal the hatch cover over the raised lip around the periphery of the port when the lock is engaged;

(h) a lock for fastening the hatch cover down on the port, said lock comprising a camming member which includes:

(1) a cam portion having an elongate arm attached thereto;

(2) a cam mount which is located adjacent to the port;

(3) a cam bearing plate;

(4) a generally horizontally-disposed camshaft that is disposed through the cam portion and mounted in the cam mount, so that the camming member may be rotated about the camshaft while the cam portion bears against the cam bearing plate, from an unlocked position in which the arm does not contact the hatch to a locked position in which the arm contacts and bears against the hatch;

(i) a secondary lock comprised of a pivoting arm that is adapted to be rotated about a generally horizontally-disposed shaft which is mounted adjacent to the port, from an unlocked position in which the arm does not contact the hatch to a locked position in which the arm contacts and bears against the hatch.

15. The hatch cover assembly of claim 14 wherein the mechanism for automatic rotation of the hatch is the shaft having threads, and the hole in the hinge portion is provided with threads that are adapted to mate therewith so that as the biasing mechanism applies the generally vertically-directed force between the seat and the hinge portion to raise the hatch upwardly off the port, the hatch will rotate from the closed position which covers the port to the open position which exposes the port by virtue of cooperation between the threaded shaft and the mating threads in the hinge portion.

16. The hatch cover assembly of claim 14 wherein the mechanism for automatic rotation of the hatch is the shaft provided with a groove having a helical portion around the periphery thereof, and wherein the hole in the shaft seat has an inner surface that is provided with a follower that is adapted to mate with the groove, said groove and follower being arranged so that as the biasing mechanism applies the generally vertically-directed force between the seat and the hinge portion to raise the hatch upwardly off the port, the follower will travel within the groove and the hatch will rotate from the closed position which covers the port to the open position which exposes the port.

17. The hatch cover assembly of claim 14 wherein the mechanism for automatic rotation of the hatch is the hole in the hinge portion having an inner surface that is provided with a groove having a helical portion around the periphery thereof, and wherein the shaft is provided with a follower that is adapted to mate with the groove, said groove and follower being arranged so that as the biasing mechanism applies the generally vertically-directed force between the seat and the hinge portion to raise the hatch upwardly off the port, the follower will travel within the groove and the hatch will rotate from the closed position which covers the port to the open position which exposes the port.

* * * * *